United States Patent
Pearson et al.

(10) Patent No.: US 8,978,135 B2
(45) Date of Patent: Mar. 10, 2015

(54) METHODS AND APPARATUS TO PROTECT MEMORY REGIONS DURING LOW-POWER STATES

(75) Inventors: Adrian R. Pearson, Beaverton, OR (US); Christopher Andrew Thornburg, Chandler, AZ (US); Steven J. Brown, Phoenix, AZ (US); Peter R. Munguia, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,342

(22) PCT Filed: Sep. 14, 2012

(86) PCT No.: PCT/US2012/055580
§ 371 (c)(1),
(2), (4) Date: Jun. 26, 2013

(87) PCT Pub. No.: WO2014/042650
PCT Pub. Date: Mar. 20, 2014

(65) Prior Publication Data
US 2014/0082724 A1    Mar. 20, 2014

(51) Int. Cl.
*G06F 21/57* (2013.01)
(52) U.S. Cl.
CPC .............. *G06F 21/57* (2013.01); *G06F 21/575* (2013.01)
USPC .......................................................... 726/22
(58) Field of Classification Search
CPC combination set(s) only.
See application file for complete search history.

(56) References Cited

U.S. PATENT DOCUMENTS

| | | | |
|---|---|---|---|
| 5,539,879 | A | 7/1996 | Pearce et al. |
| 5,944,821 | A | 8/1999 | Angelo |
| 6,081,752 | A | 6/2000 | Benson, IV et al. |
| 6,694,451 | B2 | 2/2004 | Atkinson |
| 6,930,949 | B2 * | 8/2005 | Schaefer ........................ 365/227 |
| 6,968,469 | B1 | 11/2005 | Fleischmann et al. |
| 7,793,127 | B2 * | 9/2010 | Gu et al. ........................ 713/323 |
| 8,195,248 | B2 * | 6/2012 | Ha et al. ......................... 455/574 |
| 8,199,686 | B1 * | 6/2012 | Donovan ....................... 370/311 |
| 8,214,909 | B2 * | 7/2012 | Morita et al. ................... 726/26 |
| 8,248,629 | B2 * | 8/2012 | Fukuda ......................... 358/1.14 |
| 2001/0016927 | A1 | 8/2001 | Poisner |
| 2002/0073358 | A1 | 6/2002 | Atkinson |
| 2002/0099946 | A1 | 7/2002 | Herbert et al. |

(Continued)

OTHER PUBLICATIONS

Patent Cooperation Treaty, "International Search Report," issued by the International Searching Authority in connection with PCT application No. PCT/US2012/055580, mailed Mar. 18, 2013 (3 pages).

(Continued)

*Primary Examiner* — Beemnet Dada
(74) *Attorney, Agent, or Firm* — Hanley, Flight & Zimmerman, LLC

(57) ABSTRACT

A disclosed example method involves when transitioning a processor system to a low-power mode, generating at least a first signature based on a data structure storing memory addresses of memory regions to be protected during the low-power mode. During a resume process of the processor system from the low-power mode, at least a second signature is generated based on the data structure storing the memory addresses of the memory regions to be protected during the low-power mode. When the first signature matches the second signature, the processor system resumes from the low-power mode. When the first signature does not match the second signature, an error is generated.

19 Claims, 11 Drawing Sheets

(56) References Cited

U.S. PATENT DOCUMENTS

2003/0196137 A1 10/2003 Ahmad et al.
2004/0148536 A1 7/2004 Zimmer et al.
2006/0212727 A1 9/2006 Judge et al.

OTHER PUBLICATIONS

Patent Cooperation Treaty, "Written Opinion of the International Searching Authority," issued by the International Searching Authority in connection with PCT/US2012/055580, mailed Mar. 18, 2013 (4 pages).

* cited by examiner

| PARAMETER | | BYTE OFFSET | SIZE (BYTES) | DESCRIPTION |
|---|---|---|---|---|
| 302 — STR HEADER SIGNATURE | | 0 | 16 | SIGNATURE OF 16-BYTE STR HEADER |
| 304 — STR SCATTER/GATHER TABLE SIGNATURE | | 16 | 16 | SIGNATURE OF Nx8-BYTE SCATTER/GATHER TABLE |
| 306 — STR DRAM SIGNATURE | | 32 | 16 | SIGNATURE OF DRAM AREA STIPULATED IN SCATTER/GATHER TABLE |
| 308 STR HEADER | 316 — STR DATA STRUCTURE VERSION | 48 | 4 | 0x0 = INITIAL REVISION |
| | 318 — NUMBER OF SCATTER/GATHER ARRAY ENTRIES | 52 | 4 | NUMBER OF SCATTER/GATHER ENTRIES IN THE ENCLOSED SCATTER/GATHER TABLE |
| | RESERVED | 56 | 8 | 0x0 |
| | 312 — POINTER-0 | 64 | 4 | 32-BIT POINTER TO THE START OF THE FIRST 16-BYTE ALIGNED BUFFER THAT IS COVERED BY SIGNATURE. |
| | 320 — SIZE-0 | 68 | 4 | SIZE OF FIRST 16-BYTE ALIGNED BUFFER |
| 310 SCATTER/ GATHER TABLE | ... | | 4 | |
| | 322 — POINTER-N | 64+(N-1)*8 | 4 | 32-BIT POINTER TO THE START OF Nth 16-BYTE ALIGNED BUFFER THAT IS COVERED BY SIGNATURE |
| | 324 — SIZE-N | 64+(N-1)*8 | 4 | SIZE OF Nth 16-BYTE ALIGNED BUFFER |
| | 326 — PADDING | 64+(N)*8 | UP TO 8 BYTES | PADDING BYTES TO MAKE SCATTER/GATHER TABLE SIZE A MULTIPLE OF 16 BYTES |

328 SUSPEND-TO-RAM (STR) DATA STRUCTURE FORMAT

METHODS AND APPARATUS TO PROTECT MEMORY REGIONS DURING LOW-POWER STATES

FIELD OF THE DISCLOSURE

The present disclosure relates generally to processor systems and, more particularly, to methods and apparatus to protect memory regions of a processor system during low-power states.

BACKGROUND

Energy Star standards define power levels for acceptable low-power consumption ratings of electronic devices. To comply with such Energy Star standards, electronic devices often implement one or more low-power modes. Such low-power modes include a full-off power state, a suspend-to-RAM (random access memory) power state, a suspend-to-disk (hibernate) state, and/or one or more types of standby power states. The full-off power state typically consumes the lowest amount of power of any platform power state. However, the full-off power state requires the platform to complete a full boot of the platform software after a power-on operation is re-applied. Such a full boot incurs undesirable boot latencies.

The suspend-to-RAM power state is an alternative to the full-off state. The suspend-to-RAM power state retains the operating state of the platform software as it existed immediately prior to entering the suspend-to-RAM power state. Because the platform software operating state is retained in RAM during the suspend-to-RAM power state, the platform software need only execute portions of a boot process to continue where it left off before entering the suspend-to-RAM state.

BRIEF DESCRIPTION OF THE DRAWINGS

FIG. 3 illustrates an example data structure format for storing signatures and location information for protected regions of platform software stored in system memory during a low-power state.

DETAILED DESCRIPTION

Example methods, apparatus, systems, and articles of manufacture disclosed herein enable protecting regions of memory during low-power states of processor systems. Disclosed examples are described herein in connection with a suspend-to-RAM (random access memory) power state. However, examples disclosed herein may additionally or alternatively be used to protect regions of memory during other power states of processor systems.

Processor systems may be configured to transition between different power states, ranging from full-power-on to fully off states. These different power states are provided to conserve power. Intermediate power states such as a suspend-to-RAM power state is sometimes used to strike a balance between lower power consumption and having the ability to resume operation (e.g., exit the suspend-to-RAM power state to a fully on state) relatively faster than is otherwise possible when performing a cold boot from a fully off state or a suspend-to-disk (e.g., hibernate) power state. A suspend-to-RAM power state is a low-power state in which a processor system retains a state or states in random access memory of platform software (e.g., an operating system (OS) and/or applications) that is running when the processor system initiates its transition to the suspend-to-RAM state. When the processor system resumes or exits the suspend-to-RAM state to a fully on power state, the processor system need not execute the entire platform boot software as required when performing a cold boot from a fully off state or a hibernate state. In prior systems, not executing the entire platform boot software upon resume introduces potential security risks because the platform system memory can be compromised while it is in the suspend-to-RAM power state. For example, malicious code can be written to memory regions storing the operating state(s) of the platform software. Upon resume from the suspend-to-RAM state of such prior systems, the compromised platform software could be executed, and allow an attacker to take control of the system or to otherwise compromise the system.

Unlike prior systems having security vulnerabilities when in a suspend-to-RAM power state, examples disclosed herein may be used to implement a trusted resume to provide platform software and system integrators with features to protect the platform software while processor systems are in suspend power states or low-power states (e.g., a suspend-to-RAM power state).

Figure 1:
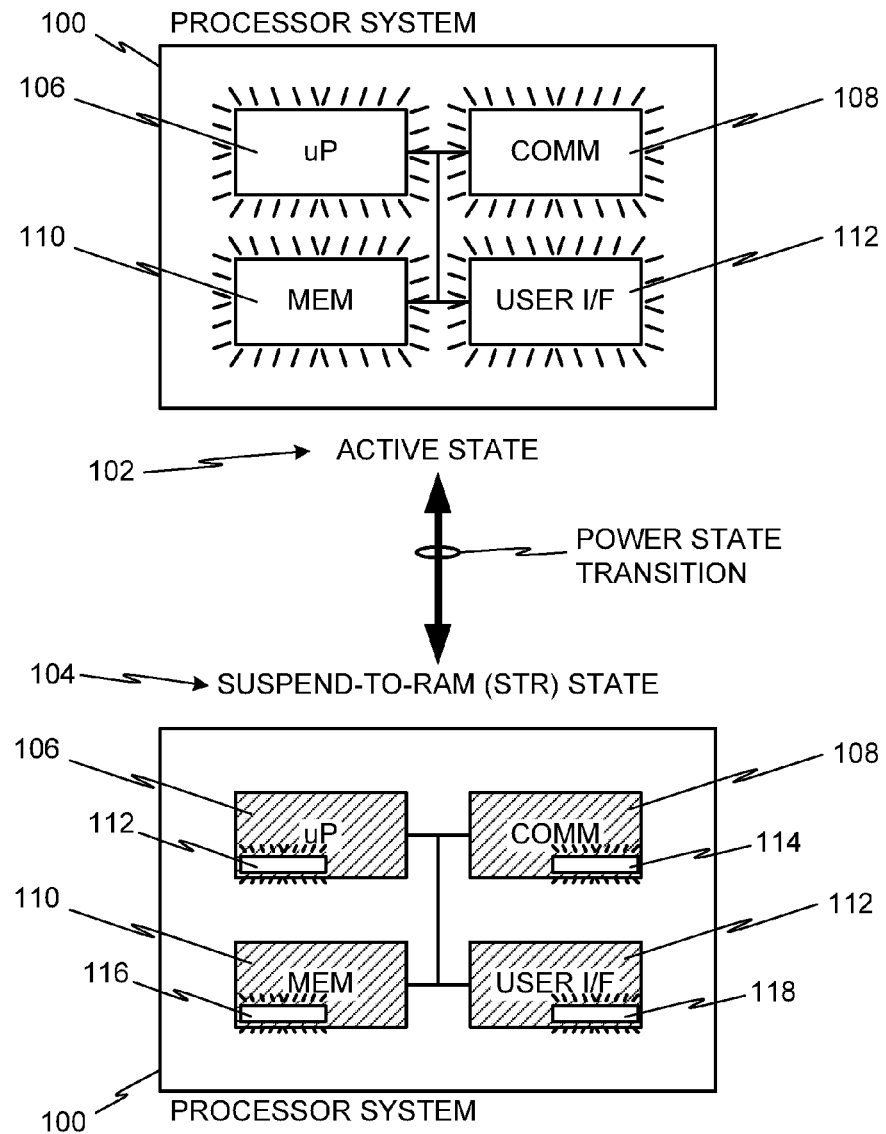
FIG. 1 illustrates an example processor system that transitions between an active power state and a suspend-to-RAM (random access memory) power state.

FIG. 1 illustrates an example processor system 100 that may be used to implement the examples disclosed herein to protect memory regions during low-power states of the processor system 100. In the illustrated example, the processor system 100 is shown transitioning between an active power state 102 and a suspend-to-RAM (STR) power state 104. In the active power state 102 of the illustrated example, a microprocessor (uP) subsystem 106, a communication subsystem 108, a memory subsystem 110, and a user interface (I/F) subsystem 112 are shown fully powered. In the suspend-to-RAM power state 104 of the illustrated example, the microprocessor subsystem 106, the communication subsystem 108, the memory subsystem 110, and the display subsystem 112 are shown in a low-power state in which power is removed from portions thereof.

In the illustrated example, the microprocessor subsystem 106, the communication subsystem 108, the memory subsystem 110, and the display subsystem 112 are only partially powered as power remains applied to portions 114, 116, 118, and 120. In this manner, the powered portions 114, 116, 118, and 120 are useable for resuming the active power state 102 of the processor system 100 from the suspend-to-RAM power state 104. In the illustrated example, the powered microprocessor portion 112 includes continuously powered memory (e.g., continuously powered memory 212 of FIG. 2) to store an address or a pointer to an authentication table (e.g., a pointer to a suspend-to-RAM data structure 216 of FIG. 2) storing security parameters (e.g., signatures) and memory address locations of platform software stored in RAM (e.g., a system memory 210 of FIG. 2) during the suspend-to-RAM power state 104. In the illustrated example, the powered communication subsystem portion 114 may include power to a wake-on-LAN (local area network) circuit or other wake-on-network circuit to resume the processor system 100 using network communications. In the illustrated example, the powered memory subsystem portion 116 includes system memory (e.g., the system memory 210 of FIG. 2) used to store the state or states of platform software when the processor system 100 is in the suspend-to-RAM power state 104. The powered user interface portion 118 of the illustrated example may include power to detect de-pressing of a power/wake button or de-pressing of a keyboard key or other user input of any other type of human interface device (HID).

Examples disclosed herein enable using a trusted resume to transition the processor system 100 from the suspend-to-RAM power state 104 to the active state 102 by providing various example protection features or trust features. In the illustrated examples, a trusted resume (a) substantially reduces the ability of malicious attacks to change contents of system memory (e.g., the system memory 210 of FIG. 2) that stores state(s) of the platform software when in a low-power mode (e.g., the suspend-to-RAM power state 104); (b) substantially reduces the ability of performing system memory replay attacks and/or rollback attacks; (c) enables designating multiple authenticated/non-authenticated regions in system memory (e.g., the system memory 210 of FIG. 2); (d) enables a host processor (e.g., a host processor 202 of FIG. 2) to generate/authenticate a signature for selected protected regions (e.g., protected regions 218 of FIG. 2) without knowledge of the signing key; and (e) enables hardware manufacturers (e.g., of host processors (e.g., the host processor 202 of FIG. 2), secure processors (e.g., a secure processor 204 of FIG. 2), and/or processor systems) and third-party vendors to specify amounts (e.g., at least minimal amounts) of protected regions (e.g., the protected regions 218 of FIG. 2) that are to be protected by using authentication and verification processes under the trusted resume techniques disclosed herein. As described in detail below, examples disclosed herein provide these protections by authenticating/signing critical portions of system memory (e.g., dynamic random access memory (DRAM)) during transitions into the suspend-to-RAM power state 104, and verifying those authenticated/signed critical portions of system memory when resuming out of the suspend-to-RAM state 104 into the active power state 102. In disclosed examples, critical portions of a boot sequence are aggregated during the boot sequence such that stage N of the boot sequence adds protected regions (e.g., the protected regions 218 of FIG. 2) about stage N+1. To guard against rollback attacks, a random or pseudo-random value (e.g., a nonce value) is incorporated into the authenticating/signing process and is stored in continuously powered memory (e.g., continuously powered memory 212 of FIG. 2) during the suspend-to-RAM power state 104.

Figure 2:
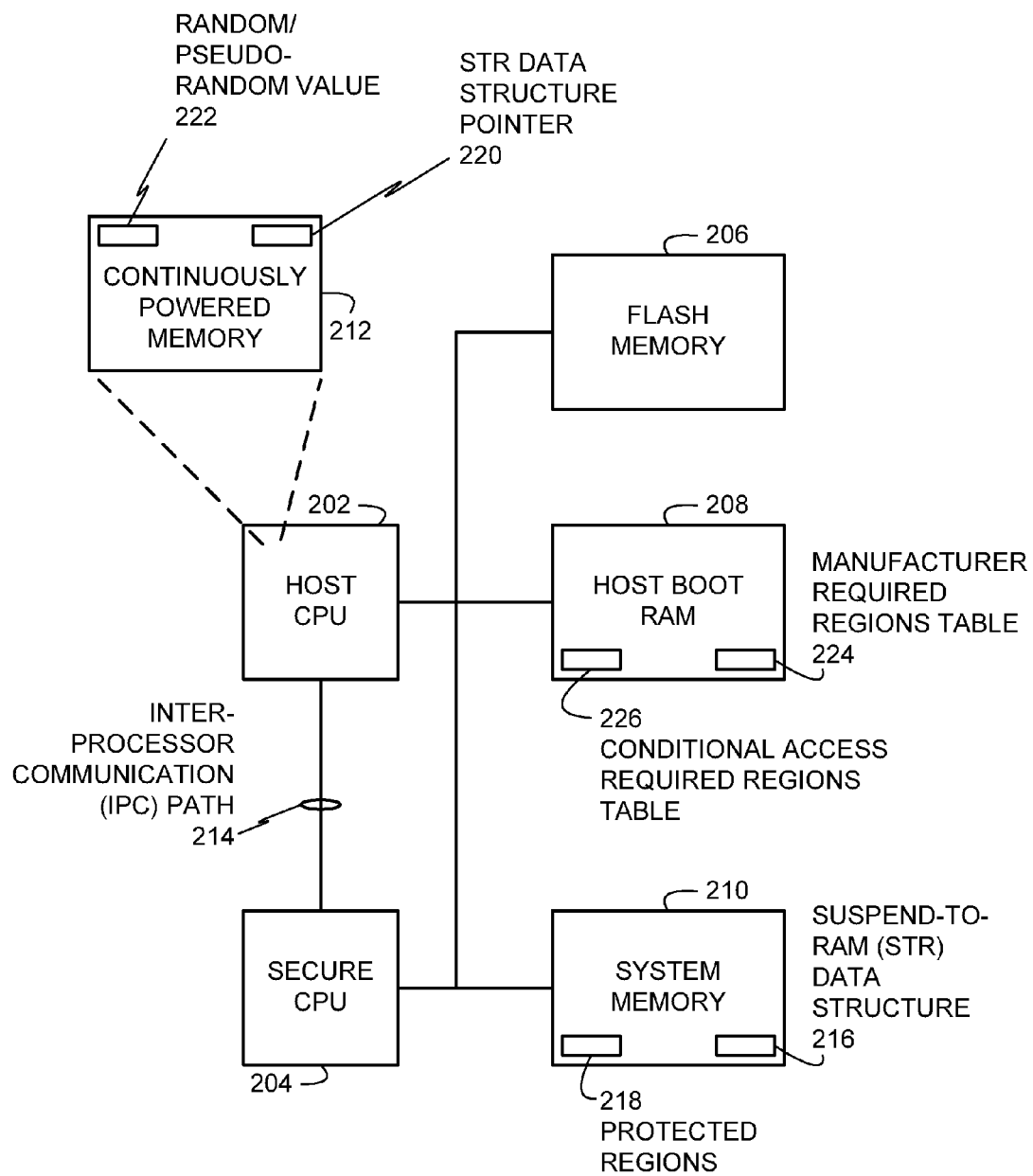
FIG. 2 illustrates example components of the example processor system of FIG. 1 that may be used to protect memory regions during low-power states of the processor system.

FIG. 2 illustrates example components of the example processor system 100 of FIG. 1 that may be used to manage power state transitions of the processor system 100. In the illustrated example, the processor system 100 includes a host processor (CPU) 202, a secure processor (CPU) 204, a flash memory 206, a host boot RAM 208, a system memory 210, and a continuously powered memory 212. The processor system 100 of the illustrated example can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set-top box, or any other type of computing device.

In the illustrated example, the host CPU 202, the secure CPU 204, and the host boot RAM 208 are located on the same silicon die so that inter-processor communications between the processors 202 and 204 and communications with the host boot RAM 208 are not exposed external to the silicon die. This provides further security in the examples disclosed herein by substantially reducing external accessibility to security communications and security data exchanged between the host CPU 202, the secure CPU 204, and/or the host boot RAM 208. Also in the illustrated example, the flash memory 206 and the system memory 210 are located on separate integrated circuits that are located on the same circuit board as the silicon die containing the host CPU 202, the secure CPU 204, and the host boot RAM 208.

The processors 202 and 204 can be implemented by using processors or controllers from any desired family or manufacturer. In the illustrated example, an inter-processor communication (IPC) path 214 is provided between the processors 202 and 204 to enable inter-processor communications therebetween. In the illustrated example, the host processor 202 includes the continuously powered memory 212 which may be implemented using an embedded static random access memory (SRAM). Because SRAM is a volatile memory, it remains powered (or a portion thereof remains powered) in the illustrated examples during low-power modes such as the suspend-to-RAM power state 104 of FIG. 1 so that data stored therein is persisted.

The processors 202 and 204 are in communication with the flash memory 206, the host boot RAM 208, and the system memory 210. Although not shown, the processors 202 and 204 may also be in communication with a mass memory (e.g., a hard drive) that stores an operating system and/or applications). In the illustrated example, the flash memory 206 is a non-volatile memory used to store parameters (e.g., security parameters and/or other parameters that are not persisted in volatile memories when power is completely removed) for booting the processor system 100. The host boot RAM 208 of the illustrated example stores boot code for booting the processor system 100 and loading an operating system. The host boot RAM 208 of the illustrated example also stores a manufacturer required region table 224 to indicate protected regions (e.g., the protected regions 218 of FIG. 2) of platform software stored in the system memory 210. In the illustrated example, a hardware manufacturer of the host CPU 202, the secure CPU 204, the processor system 100, and/or one or more hardware components of the processor system 100 specifies the regions (e.g., the protected regions 218) indicated in the manufacturer required region table 224 so that those specified regions are protected using examples disclosed herein during the suspend-to-RAM power state 104 (FIG. 1) to implement a trusted resume.

In the illustrated example, the host boot RAM 208 also stores a conditional access (CA) required regions table 226 (e.g., a third-party required regions table) to indicate third-party-specified protected regions (e.g., the protected regions 218 of FIG. 2) of platform software stored in the system memory 210. In the illustrated examples, the CA required regions table 226 is accessible and modifiable by third-parties for after-market products or developments (e.g., after-market software and/or hardware installations in the processor system 100). For example, one or more third-parties specify the regions (e.g., the protected regions 218) indicated in the CA required regions table 226 so that those specified regions are protected using examples disclosed herein during the suspend-to-RAM power state 104 (FIG. 1) to implement a trusted resume. In the illustrated examples, the CA required regions table 226 is copied into and authenticated from the host boot RAM 208 by the secure CPU 204 before the host CPU 202 begins executing instructions. In the illustrated examples, this happens during power state transitions in which the host CPU 202 boots from its reset vector (e.g., when resuming from the suspend-to-RAM power state 104 and/or during cold boots). In some examples, the CA required regions table 226 may be stored in an authenticated area of the host boot RAM 208 that is authenticated during a stage-1 boot loader (e.g., a stage-1 boot process shown in FIG. 5). Alternatively, the CA required regions table 226 could be implemented as part of stage-1 boot loader parameter blocks.

Using the manufacturer required regions table 224 and the CA required regions table 226 enables a hardware manufacturer and third parties to specify protected regions (e.g., the protected regions 218) that they deem useful of protecting using examples disclosed herein. In some examples, the manufacturer required regions table 224 and the CA required regions table 226 may alternatively be implemented as a single table stored in the host boot RAM 208.

The system memory 210 of the illustrated example stores the operating state(s) of platform software (e.g., an operating system and/or applications) that is running at the time that the processor system 100 transitions from the active power state 102 to the suspend-to-RAM power state 104 of FIG. 1. In this manner, the processor system 102 can transition out of the suspend-to-RAM power state 104 to the active power state 102 based on the platform software state(s) stored in the system memory 210 to resume the same operating state that it was in before entering the suspend-to-RAM power state 104. For example, the operating system can resume to its same previous operating state, and applications that were previously loaded and running can resume to their same previous operating states.

The system memory 210 of the illustrated example is implemented using a volatile dynamic random access memory (DRAM). In some examples, to enable such a volatile DRAM to persist its data while in the suspend-to-RAM power state 104, at least a minimal amount of power is supplied to the volatile DRAM, and the volatile DRAM is set to operate in a low-power, self-refresh mode in which data stored therein is persisted. In other examples, the system memory 210 may be implemented using a cache memory, a volatile SRAM, and/or any other type of volatile or non-volatile memory.

In the illustrated example, the system memory 210 stores a suspend-to-RAM (STR) data structure 216 and protected regions 218 of platform software. In the illustrated example, the protected regions 218 store select portions of platform software stored in the system memory 210 during the suspend-to-RAM power state 104, and that are to be protected from attacks by signing or authenticating the protected regions 218 using security parameters (e.g., signatures). The STR data structure 216 stores addresses or pointers to the protected regions 218 of the platform software in the system memory 210 that are to be protected using examples disclosed herein during the suspend-to-RAM power state 104. The STR data structure 216 of the illustrated example also stores the security parameters (e.g., signatures) for authenticating its data, and determining the validity of its data when resuming from the suspend-to-RAM power state 104. An example format used to implement the STR data structure 216 in the illustrated examples is described below in connection with FIG. 3.

Attacks may be attempted on the processor system 100 by attackers modifying the information in the STR data structure 216 to point to different regions of the system memory 210 storing malicious software in an attempt to cause the host CPU 202 to execute such malicious code when the processor system 100 resumes to the fully active power state 102. To detect whether such modifications exist in the STR data structure 216, a verification process disclosed herein is performed during a trusted resume of the processor system 100, and the verification process generates an error when it detects that the STR data structure 216 has been modified during the suspend-to-RAM power state 104. In this manner, the host CPU 202 and/or the secure CPU 204 can prevent the processor system 100 from proceeding with the resume process so that the processor system 100 cannot be compromised by malicious software.

In the illustrated example, the continuously powered memory 212 of the host CPU 202 stores an example STR data structure pointer 220 that points to the storage location (e.g., a memory address) of the STR data structure 216 in the system memory 210. During a trusted resume process to transition the processor system 100 out of the suspend-to-RAM power state 104, the host CPU 202 can retrieve the STR data structure pointer 220 to locate the STR data structure 216 to enable verifying the integrity of the protected regions 218 of the platform software.

In the illustrated example, the continuously powered memory 212 of the host CPU 202 also stores an example random/pseudo-random value 222. The random/pseudo-random value 222 of the illustrated example is used as a nonce value to generate verification signatures to confirm the integrity of the protected regions 208 of the platform software stored in the system memory 210 during the suspend-to-RAM power state 104. In the illustrated example, the random/pseudo-random value 222 is used to generate the verification signatures when the processor system 100 is transitioning into the suspend-to-RAM power state 104. After generating the verification signatures, the random/pseudo-random value 222 is stored securely from undesired access in the continuously powered memory 212. In this manner, when resuming out of the suspend-to-RAM power state 104, the random/pseudo-random value 222 can be retrieved from the continuously powered memory 212 and used to verify the integrity of the protected regions 218 of the platform software. In the illustrated example, the random/pseudo-random value 222 is used to guard against replay/rollback attacks by serving as a unique secret value that is very difficult for any potential attacker to access or modify because it is stored in the continuously power memory 212 of the host CPU 202. In addition, the random/pseudo-random value 222 is not easily predictable by an attacker because it is sufficiently random. In some examples, selecting a relatively large number of bits (e.g., 64 bits or more) for the random/pseudo-random value 222 also guards against replay/rollback attacks by making it very costly from a time and storage perspective for an attacker to launch a collision attack. For example, using a random/pseudo-random value 222 with a relatively large number of bits would require an attacker to store many DRAM/STR data structure permutations to launch a collision attack.

FIG. 3 illustrates an example suspend-to-RAM (STR) data structure format 300 that may be used to implement the STR data structure 216 of FIG. 2 to store signatures and location information to authenticate the protected regions 218 of platform software persisted in the system memory 210 of FIG. 2 during the suspend-to-RAM power state 104 of FIG. 1. In the illustrated example, the STR data structure format 300 includes an STR header signature field 302 for storing an STR signature at a byte offset of zero (0), and occupying a data size of 16 bytes in the STR data structure 216. The STR header signature of the illustrated example is used to authenticate a STR header (e.g., stored in STR header fields 308) of the STR data structure 216 to confirm that it is valid (e.g., it has not been altered or compromised during the suspend-to-RAM power state 104).

The STR data structure format 300 of the illustrated example includes a STR scatter/gather table signature field 304 for storing a STR scatter/gather table signature at a byte offset of 16, and occupying a data size of 16 bytes in the STR data structure 216. In the illustrated examples, the STR scatter/gather table signature is used to authenticate an N×8-byte scatter/gather table 310 stored in the STR data structure 216 to confirm that it is valid (e.g., it has not been altered or compromised during the suspend-to-RAM power state 104). In the illustrated example, the scatter/gather table 310 stores pointers to locations in the system memory 210 storing the protected regions 218 of the platform software.

The STR data structure format 300 of the illustrated example also includes a STR DRAM signature field 306 for storing a STR DRAM signature at a byte offset of 32, and occupying a data size of 16 bytes in the STR data structure 216. In the illustrated examples, the STR DRAM signature is used to authenticate a DRAM area stipulated in the scatter/gather table 310 stored in the STR data structure 216 to confirm that it is valid (e.g., it has not been altered or compromised during the suspend-to-RAM power state 104). In the illustrated example, the DRAM area stipulated by the scatter/gather table 310 is pointed to by a pointer stored in a pointer-0 field 312, and it is the first 16-byte aligned buffer of the protected regions 218 (FIG. 2).

In the illustrated examples, signatures stored in the STR header signature field 302, the STR scatter/gather table signature field 304, and the STR DRAM signature field 306 are used to sign the STR data structure 216 when the processor system 100 is transitioning into the suspend-to-RAM power state 104. In this manner, the stored signatures can be used when resuming the processor system 100 out of the suspend-to-RAM power state 104 to determine whether the STR data structure 216 is valid (e.g., has not been altered or compromised during the suspend-to-RAM power state 104). For example, potential attackers may modify the information in the STR data structure 216 to point to different regions of the system memory 210 storing malicious software in an attempt to cause the host CPU 202 to execute such malicious code when the processor system 100 resumes to the fully active power state 102. If such modifications exist in the STR data structure 216, a verification process performed during a trusted resume of the processor system 100 generates an error based on the signature(s) of one or more of the STR header signature field 302, the STR scatter/gather table signature field 304, and/or the STR DRAM signature field 306.

Although three signature fields 302, 304, and 306 are shown in FIG. 3, fewer signatures (e.g., one signature or two signatures) or more signatures (e.g., more than three signatures) may be used with the examples disclosed herein to authenticate/sign the STR data structure 216 and confirm its validity during resume operations. In addition, although specific types of signatures are disclosed herein (e.g., a header signature, a scatter/gather table signature, and a DRAM signature), other types of signatures and/or other manners of generating signatures may be used with examples disclosed herein to authenticate/sign the STR data structure 216 and confirm its validity during resume operations. For example, one or more signatures may be generated based on different information (e.g., more information, less information, or differently segmented information) in the STR data structure 216, so long as the signature(s) can be used to authenticate/sign the STR data structure 216 when entering a low-power mode, and validate it during a resume process.

The STR header fields 308 of the illustrated example includes an STR data structure version field 316 to indicate a revision of the STR data structure format 300, and a number of scatter/gather array entries field 318 to indicate the number of scatter/gather entries stored in the scatter/gather table 310.

In the illustrated example, each scatter/gather entry in the scatter/gather table 310 includes the memory address location and data size of a corresponding memory region in the protected regions 218 (FIG. 2). The scatter/gather table 310 includes the pointer-0 field 312 to store a pointer pointing to the memory address location in the system memory 210 of the first 16-byte aligned buffer that is protected by the STR DRAM signature stored in the STR DRAM signature field 306. A size-0 field 320 of the scatter/gather table 310 stores the data size in bytes of the first 16-byte aligned buffer. The scatter/gather table 310 of the illustrated example includes a plurality of other pointer/size field pairs 322 indicating memory address locations in system memory 210 and corresponding data sizes of other 16-byte aligned buffers up to an Nth 16-byte aligned buffer corresponding to a pointer-N field 324 and a size-N field 326. In the illustrated example, the pointer and size fields 312, 320, 322, 324, and 326 refer to 16-byte aligned buffers in the system memory 210 that store the protected regions 218. By storing the addresses and sizes of the protected regions 218 in this manner in the STR data structure 216, examples disclosed herein can determine whether it is safe to access the protected regions 218 when resuming from the suspend-to-RAM power state 104 by relying on an authentication/signing of the STR data structure 216.

In the illustrated example, the scatter/gather table 310 is extensible to being a size that is a multiple of 16 bytes. For this extensibility, the scatter/gather table 310 is provided with padding bytes 328.

Although the example STR data structure format 300 is shown in FIG. 3 in connection with particular data sizes (e.g., 4 bytes, 8 bytes, 16 bytes, 32 bytes, etc.) and byte offsets, other data sizes and/or byte offsets may be used for parameters of the STR data structure format 300 (e.g., data sizes and/or byte offsets of signatures and/or other parameters). Although the scatter/gather table 310 refers to 16-byte aligned buffers, the scatter/gather table 310 may be adapted for use with other buffer sizes. In addition, although pointers and size values in the scatter/gather table 310 are used in the illustrated example to specify locations and sizes of the protected regions 218 (FIG. 2), other suitable manners for specifying locations and/or sizes of the protected regions 218 may additionally or alternatively be used.

FIGS. 4, 5, 6, 7A, 7B, and 8-10 are representative of machine readable instructions that may be executed by the processor system 100 (FIGS. 1 and 2) to protect regions of memory during low-power states as disclosed herein. In these examples, the machine readable instructions comprise programs for execution by one or more processors such as the host CPU 202 and the secure CPU 204 of FIG. 2. The programs may be embodied in software stored on a tangible computer readable medium such as a CD-ROM, a floppy disk, a hard drive, a digital versatile disk (DVD), a Blu-ray disk, or a memory associated with the processors 202 and 204, but the entire program and/or parts thereof could alternatively be executed by a device other than the processors 202 and 204 and/or embodied in firmware or dedicated hardware. Further, although the example programs are described with reference to the flowcharts illustrated in FIGS. 4, 5, 6, 7A, 7B, and 8-10, many other methods of implementing the example processor system 100 may alternatively be used. For example, the order of execution of the blocks may be changed, and/or some of the blocks described may be changed, eliminated, or combined.

As mentioned above, the example processes of FIGS. 4, 5, 6, 7A, 7B, and 8-10 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4, 5, 6, 7A, 7B, and 8-10 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage device or storage disc and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
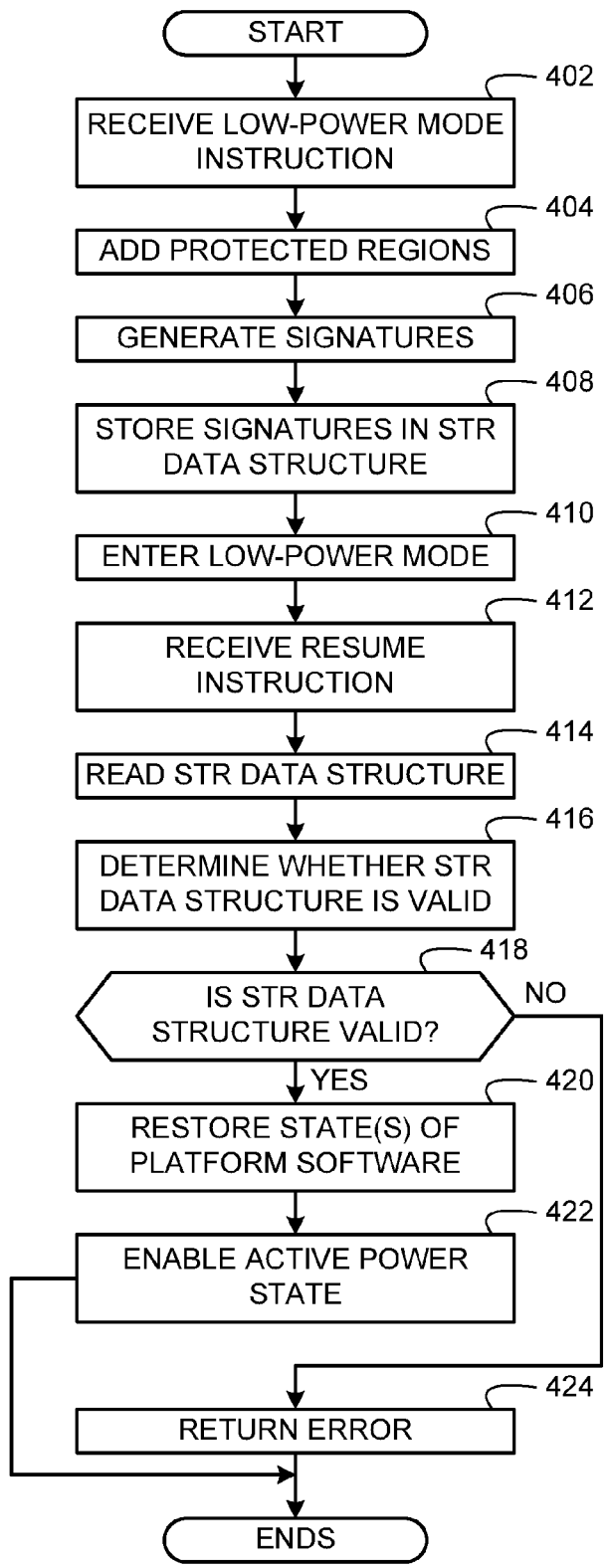
FIG. 4 illustrates an example flow diagram representative of computer readable instructions that may be executed to transition the processor system of FIG. 1 between a low-power mode power state and an active power state in accordance with the teachings of this disclosure.

FIG. 4 is an example flow diagram representative of computer readable instructions to transition the processor system 100 of FIG. 1 between the active power state 102 (FIG. 1) and the suspend-to-RAM power state 104 (FIG. 1) in accordance with the teachings of this disclosure. For a more detailed discussion, FIGS. 5, 6, 7A, 7B, and 8-10 described below show additional example operations that may be performed to transition the processor system 100 between the active power state 102 and the suspend-to-RAM power state 104 as disclosed herein.

Turning in detail to FIG. 4, initially, the host CPU 202 (FIG. 2) receives a low-power mode instruction (block 402). The low-power mode instruction of the illustrated example is an instruction to transition the processor system 100 (FIGS. 1 and 2) to the suspend-to-RAM power state 104 (FIG. 1). The secure CPU 204 (FIG. 2) adds entries to identify the protected regions 218 in the STR data structure 216 of FIG. 2 (block 404). For example, the secure CPU 204 stores information indicating the quantity of the protected regions 218 in the number of scatter/gather array entries field 318 (FIG. 3) of the STR data structure 216 (FIG. 2), and stores entries in the scatter/gather table 310 (FIG. 3) of the STR data structure 216 describing the locations and sizes of the protected regions 218. In the illustrated example, the secure CPU 204 determines which memory regions are to be protected regions 218 based on memory regions specified by a hardware manufacturer in the manufacturer required regions table 224 of FIG. 2 and/or memory regions specified by one or more third parties in the conditional access required regions table 226 of FIG. 2.

The secure CPU 204 generates signatures (block 406) for authenticating the STR data structure 216. For example, the secure CPU 204 generates signatures for storing in the STR header signature field 302, the STR scatter/gather table signature 304, and the STR DRAM signature field 306 of FIG. 3. The secure CPU 204 may use any suitable function for generating the signatures including, for example, a cipher-based message authentication code (CMAC) function, a hash-based message authentication code (HMAC), or any other suitable function for generating signatures. In the illustrated example, the secure CPU 204 generates a STR header signature by applying the signature generating function to the STR header stored in the STR header field 308 (FIG. 3) of the STR data structure 216. In the illustrated example, the secure CPU 204 generates a STR scatter/gather table signature by applying the signature generating function to the STR scatter/gather table stored in the STR scatter/gather table 310 (FIG. 3) of the STR data structure 216. In the illustrated example, the secure CPU 204 generates a STR DRAM signature by applying the signature generating function to the DRAM area pointed to by the pointer-0 field 312 of the scatter/gather table 310, and occupying the first 16-byte aligned buffer of the protected regions 218 (FIG. 2). In some examples, the signature generating function may be used in combination with other data (e.g., random/pseudo-random values) when generating the signatures to add additional authentication strength.

The secure CPU 204 stores the signatures in the STR data structure 216 (block 408). For example, the secure CPU 204 stores the signatures in the STR header signature field 302, the STR scatter/gather table signature 304, and the STR DRAM signature field 306 (FIG. 3) of the STR data structure 216 (FIG. 2). The processor system 100 enters the low-power mode (block 410). In the illustrated example, the low-power mode is the suspend-to-RAM power state 104 of FIG. 1.

At some subsequent time, the processor system 100 receives a resume instruction (block 412). For example, the processor system 100 receives a wake-on-LAN instruction via the communication subsystem 108 of FIG. 1, or receives a user input via the user interface 112 of FIG. 1, or receives any other suitable input (e.g., a wake-up timer input, a service interrupt, etc.) to transition the processor system 100 from the suspend-to-RAM state 104 to the active state 102.

The secure CPU 204 reads the STR data structure 216 (block 414) from the system memory 210. The secure CPU 204 determines whether the STR data structure 216 is valid (block 416). For example, the secure CPU 204 re-generates signatures in the same manner as described above in connection with block 406 for comparing against the signatures stored in the STR header signature field 302, the STR scatter/gather table signature field 304, and the STR DRAM signature field 306 of FIG. 3. In this manner, the secure CPU 204 can compare each signature generated at block 416 with its corresponding signature generated at block 406 (e.g., the STR header signature, the STR scatter/gather table signature, and the STR DRAM signature) to verify different parts of the STR data structure 216 and confirm whether the STR data structure 216 is valid. If any re-generated signature does not match its corresponding signature from block 406, then the secure CPU 204 can determine that a potential attack on the processor system 100 is being attempted.

If the secure CPU 204 determines that the STR data structure 216 is valid (block 418), the host CPU 202 restores the state(s) of the platform software (block 420). The host CPU 202 enables the active power state 102 of the processor system 100 (block 422). However, if at block 418 the secure CPU 204 determines that the STR data structure 216 is not valid (e.g., one of the re-generated signatures does not match its corresponding signature generated at block 406 and stored in the STR data structure 216), the secure CPU 204 returns an error to the host CPU 204 (block 424). In this manner, the host CPU 204 can prevent the processor system 100 from resuming the active state 100, and can perform a pre-defined operation or process to prevent an attack on the processor system 100. In some examples, such a pre-defined operation or process involves initiating a hard reset of the processor system 100. After enabling the active power state 102 at block 422 or after returning an error at block 424, the example process of FIG. 4 ends.

Figure 5:
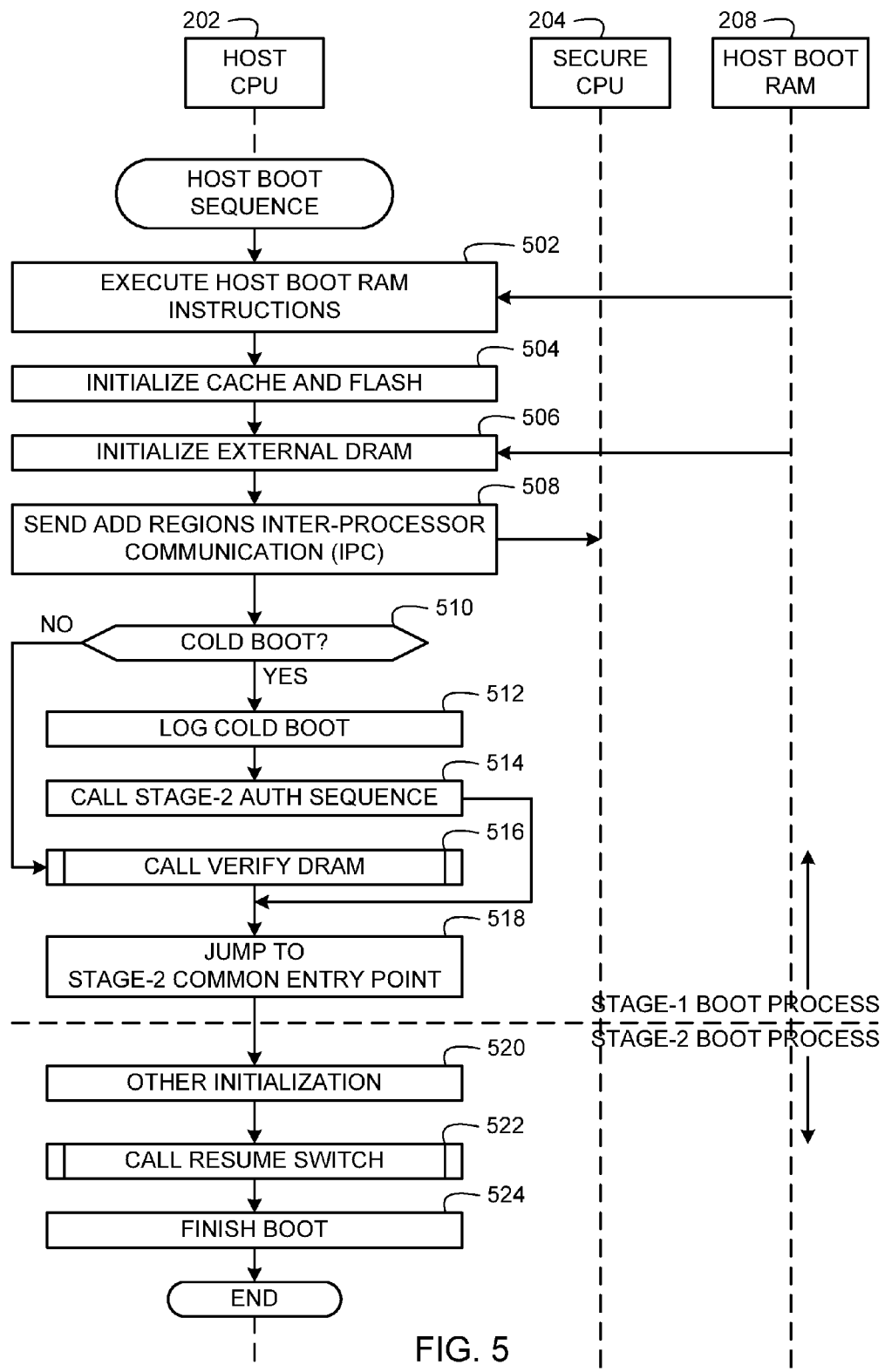
FIG. 5 illustrates an example flow diagram representative of computer readable instructions that may be executed to perform a host boot sequence to boot a processor system during a cold boot or a resume from a low-power state.

FIG. 5 illustrates an example flow diagram representative of computer readable instructions that may be executed to perform a host boot sequence to boot the processor system 100 (FIGS. 1 and 2) during a cold boot or a resume from the suspend-to-RAM power state 104 (FIG. 1). In the illustrated example, the operations up to and including block 518 are performed as part of a stage-1 (S1) boot process, and the operations of blocks 520, 522, and 524 are performed during a stage-2 (S2) boot process.

Initially, the host CPU 202 executes host boot ram instructions (block 502) stored in the host boot ram 208. The host CPU 202 initializes cache and the flash memory 206 (block 504). The host CPU 202 initializes external DRAM (block 506). In the illustrated example, the external DRAM is the system memory 210. In some examples, the host CPU 202 initializes the external DRAM using S1 parameters (stage-1 boot loader parameters) stored in the host boot RAM 208.

The host CPU 202 sends an ADD regions IPC instruction to the secure CPU 204 via the inter-processor communication path 214 of FIG. 2 (block 508). In the illustrated example, the host CPU 202 issues the ADD regions IPC instruction so that regions of platform software stored/created during a stage 2 boot process can be designated as protected regions 218 (FIG. 2) so that they can be protected using the signing/authentication techniques disclosed herein.

The host CPU 202 determines whether it is performing a cold boot (block 510) from a full power-off state. If it is performing a cold boot, the host CPU 202 logs the cold boot (block 512) and calls a stage-2 authentication sequence (block 514). Otherwise, if the host CPU 202 determines that it is not performing a cold boot (block 510), it is resuming form the suspend-to-RAM power state 104 (FIG. 1), and the host CPU 202 calls a verify DRAM process (block 516). An example process to verify DRAM that may be called at block 516 is described below in connection with FIGS. 7A and 7B.

After calling the stage-2 authentication sequence at block 514, or after calling the verify DRAM process at block 516, the host CPU 202 jumps to a stage-2 common entry point (block 518). In the illustrated example, the stage-2 common entry point allows the host CPU 202 to execute a stage-2 boot process.

During the stage-2 boot process, the host CPU 202 performs other initialization operations (block 520). Such other initialization operations may include other initializing other portions of the microprocessor subsystem 106 and/or the memory subsystem 110, initializing portions of the communication subsystem 108, initializing other portions of the user interface subsystem 112 of FIG. 1, and/or performing any other initializations configured by system designers as needing to occur during the stage-2 boot process.

The host CPU 202 calls a resume switch process (block 522). An example resume switch process that may be called at block 522 is described below in connection with FIG. 8. In the illustrated examples, the resume switch process enables adding an ACPI table as a protected region 218. The host CPU 202 then finishes the remainder of the boot operations (block 524). In the illustrated example, the remaining boot operations that are performed are based on whether the host CPU 202 is performing a cold boot or a resume. The example process of FIG. 5 then ends.

Figure 6:
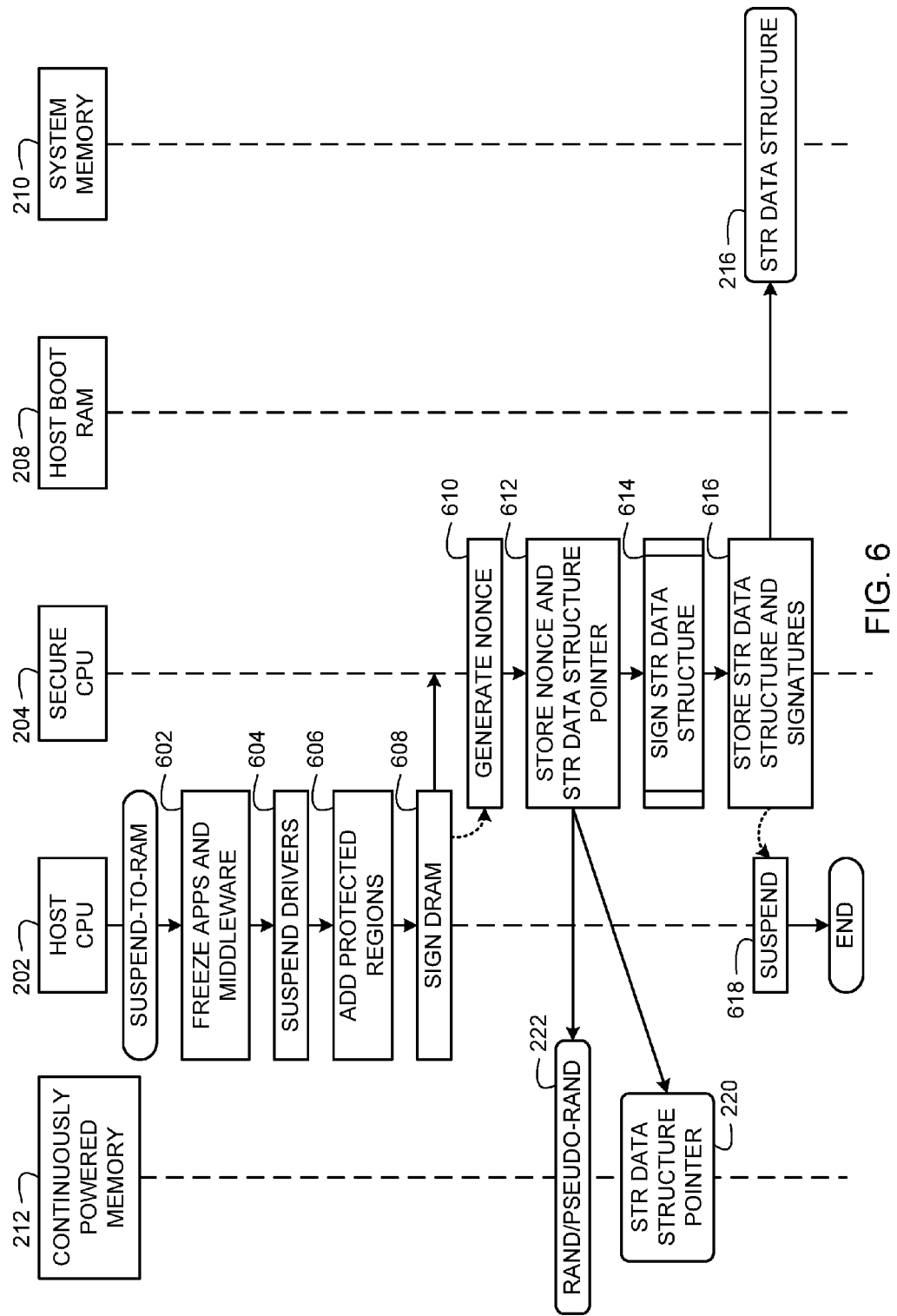
FIG. 6 illustrates an example flow diagram representative of computer readable instructions that may be executed to transition a processor system to a low-power state.

FIG. 6 illustrates an example flow diagram representative of computer readable instructions that may be executed to transition the processor system 100 (FIGS. 1 and 2) to the suspend-to-RAM power state 104 (FIG. 1) from the active power state 102 (FIG. 1). In the illustrated example, the example process of FIG. 6 may be invoked by a user input (e.g., a user pressing/selecting a sleep button), a timeout interrupt, or any other suitable user and/or machine input to transition the processor system 100 to a low-power mode.

Initially, the host CPU 202 freezes applications and middleware (block 602), for example, from executing any further until the processor system 100 resumes back to the active power state 102. The host CPU 202 suspends drivers (block 604). The host CPU 202 adds the protected regions 218 to the STR data structure 216 (block 606). In the illustrated example, the host CPU 202 adds the protected regions 218 of platform software to the STR data structure 216 by adding location and size information in a scatter/gather table of the STR data structure 216 in accordance with the format of the scatter/gather table 310 of FIG. 3. In this manner, the STR data structure 216 can be used to locate the protected regions 218 in the system memory 210. The host CPU 202 sends an IPC instruction to the secure CPU 204 to sign/authenticate the DRAM (block 608). The sign DRAM IPC instruction of the illustrated example causes the secure CPU 204 to sign the STR data structure 216 stored in the system memory 210.

The secure CPU 204 then performs operations to sign the STR data structure 216. Initially, the secure CPU 204 generates a nonce value (block 610). In the illustrated example, the generated nonce value is the random or pseudo-random value 222 of FIG. 2, and it is used to generate signatures for signing/authenticating the STR data structure 216. The signatures of the illustrated example include signatures to be stored in the STR header signature field 302, the STR scatter/gather table signature field 304, and the STR DRAM signature field 306 of FIG. 3. In the illustrated example, the random/pseudo-random value 222 is used for the nonce value to make it difficult for any potential attacker to replay the contents of DRAM.

The secure CPU 204 stores the nonce value (e.g., the random/pseudo-random value 222) and the STR data structure pointer 220 (FIG. 2) in the continuously powered memory 212 (block 612). In this manner, the nonce value (e.g., the random/pseudo-random value 222) and the STR data structure pointer 220 are persisted during the suspend-to-RAM power state 104, and are accessible to resume to the active power state 102, because the continuously powered memory 212 remains powered during the suspend-to-RAM power state 104.

The secure CPU 204 signs the STR data structure 216 of FIG. 2 (block 614). In the illustrated example, the secure CPU signs the STR data structure 216 by generating the signatures corresponding to the STR header signature field 302, the STR scatter/gather table signature field 304, and the STR DRAM signature field 306 of FIG. 3. An example signature process that may be used to implement block 614 is described below in connection with FIG. 9.

The secure CPU 204 stores the STR data structure 216 and the signatures (e.g., the signatures in the STR header signature field 302, the STR scatter/gather table signature field 304, and the STR DRAM signature field 306) in the system memory 210 (block 616). The host CPU 202 transitions the processor system 100 into the suspend-to-RAM power state 104 (block 618). The example process of FIG. 6 then ends.

Figure 7A:
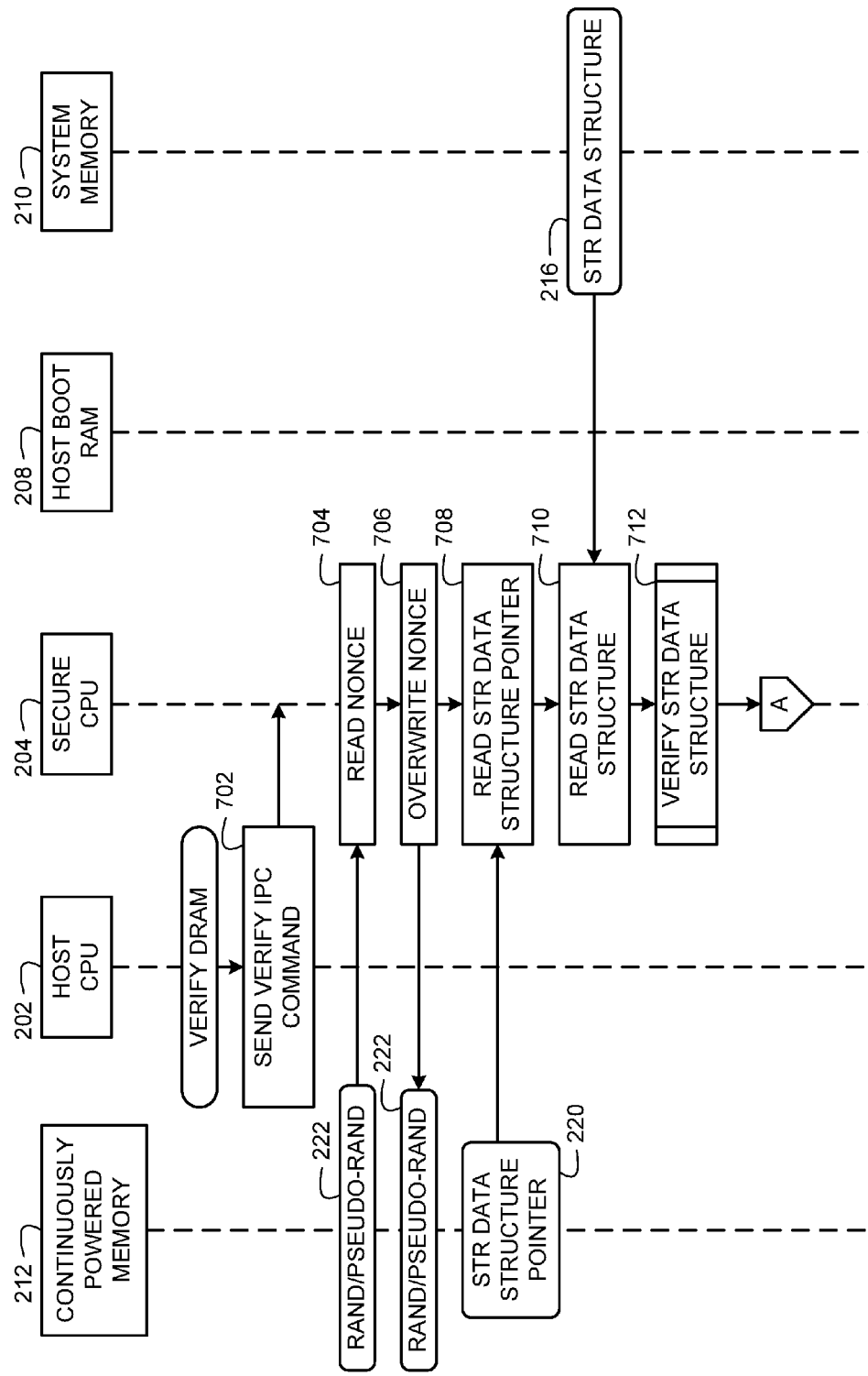
FIGS. 7A and 7B illustrate an example flow diagram representative of computer readable instructions that may be executed to verify protected regions of system memory storing data for a software platform operating state.
Figure 7B:
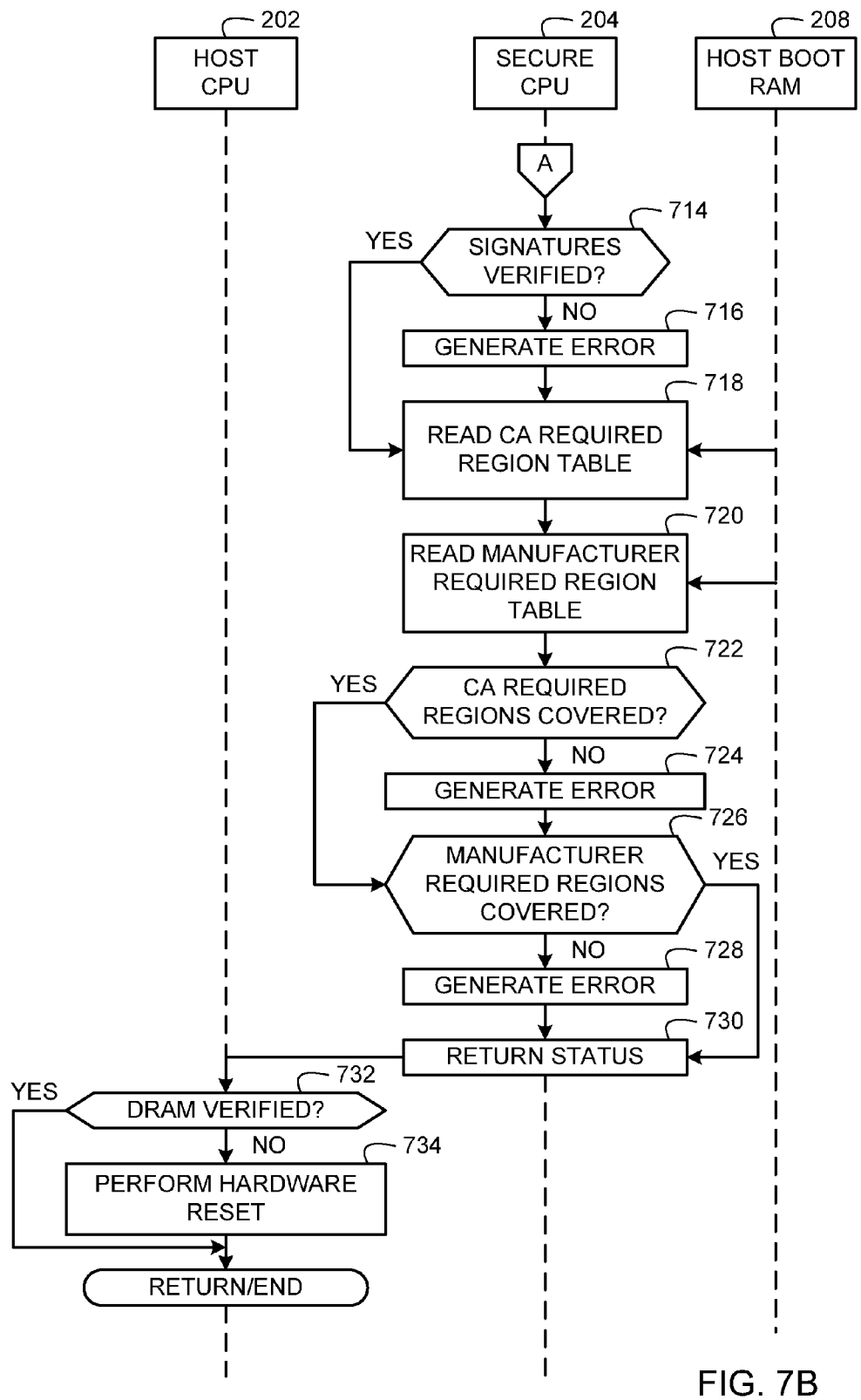

FIGS. 7A and 7B illustrate an example flow diagram representative of computer readable instructions that may be executed to verify the validity of the protected regions 218 (FIG. 2) in the system memory 210 (FIG. 2) storing data for a software platform operating state. The example process of FIGS. 7A and 7B may be instantiated from block 516 of FIG. 5. As shown in FIG. 7A, initially, the host CPU 202 sends a verify IPC command to the secure CPU 204 (block 204). The verify IPC command causes the secure CPU 204 to perform a verification process to verify the validity of the protected regions 218. The secure CPU 204 reads a nonce value (e.g., the random/pseudo-random value 222) from the continuously powered memory 212 (block 704). In the illustrated example, the nonce value is the random/pseudo-random value 222 (FIG. 2) that was generated at block 610 of FIG. 6 when transitioning the processor system 100 to the suspend-to-RAM power state 104.

The secure CPU 204 overwrites the nonce value (e.g., the random/pseudo-random value 222) in the continuously powered memory 212 (block 706), for example, with any random data. In the illustrated example, overwriting the nonce value in this manner guards against replay attacks by not leaving the nonce value exposed for re-use by potential attackers. The secure CPU 204 reads the STR data structure pointer 220 from the continuously powered memory 212 (block 708). The secure CPU 204 uses the STR data structure pointer 220 to locate and read the STR data structure 216 (FIG. 2) from the system memory 210 (block 710). The secure CPU 204 verifies the validity of the STR data structure 216 (block 712). An example process that may be used to verify the validity of the STR data structure 216 at block 712 is described below in connection with FIG. 10.

The secure CPU 204 determines whether the signatures are verified (block 714) (FIG. 7B). In the illustrated example, the signatures that are checked for validity are the signatures of the signatures in the STR header signature field 302, the STR scatter/gather table signature field 304, and the STR DRAM signature field 306 of FIG. 3. If the secure CPU 204 determines at block 714 that one or more of the signatures is/are not verified as valid, the secure CPU 204 generates an error (block 716). After generating the error at block 716, or if the secure CPU 204 determines at block 714 that all of the signatures are verified as valid, the secure CPU 204 reads the CA required region table 226 of FIG. 2 (block 718). The secure CPU 204 also reads the manufacturer required region table 224 of FIG. 2 (block 720). In the illustrated example, the secure CPU 204 may retrieve the CA required region table 226 and the manufacturer required region table 224 from the host boot RAM 208 at addresses provided by the host CPU 202. For example, the addresses at which the CA required region table 226 and the manufacturer required region table 224 are located may be stored as pointers in S1 parameters, and may be retrieved by the host CPU 202 form the S1 parameters.

The secure CPU 204 determines whether the regions specified in the CA required regions table 226 are covered by the STR data structure 216 (block 722). For example, the secure CPU 204 compares the regions specified in the CA required regions table 226 to the protected regions 218 specified in the scatter/gather table 310 (FIG. 3) of the STR data structure 216. If the regions specified in the CA required regions table 226 are not covered by the STR data structure 216 (block 722), the secure CPU 204 generates an error (block 724). After generating the error at block 724, or if the secure CPU 204 determines at block 722 that the regions specified in the CA required regions table 226 are covered by the STR data structure 216, the secure CPU 204 determines whether the regions specified in the manufacturer required regions table 224 are covered by the STR data structure 216 (block 726). For example, the secure CPU 204 compares the regions specified in the manufacturer required regions table 224 to the protected regions 218 specified in the scatter/gather table 310 (FIG. 3) of the STR data structure 216. If the regions specified in the manufacturer required regions table 224 are not covered by the STR data structure 216 (block 726), the secure CPU 204 generates an error (block 728). After generating the error at block 728, or if the secure CPU 204 determines at block 726 that the regions specified in the manufacturer required regions table 224 are covered by the STR data structure 216, the secure CPU 204 returns a status to the host CPU 202 (block 730) indicating, for example, whether any verification errors were generated, whether the signatures were successfully verified as valid at block 714, and/or whether the regions specified in the CA required regions table 226 and the manufacturer required regions table 224 are covered by the STR data structure 216.

The host CPU 202 determines whether the DRAM (e.g., the system memory 210) is verified as valid (block 732), for example, based on the status (e.g., an error status or a verification success status) received from the secure CPU 204. If the DRAM is not verified, the host CPU 202 performs a hardware reset (block 734). In the illustrated example, when the DRAM is not verified, it is possible that an attack could be made on the processor system 100. As such, a hardware reset is used at block 734 to re-initialize the processor system 100 to boot anew from a cold boot state so that contents of the system memory 210 are discarded and are re-loaded and/or re-initialized. After performing the hardware reset 734, or if the DRAM is verified as valid at block 732, the example process of FIGS. 7A and 7B ends and/or returns to a calling function or process such as the example process of FIG. 5.

Figure 8:
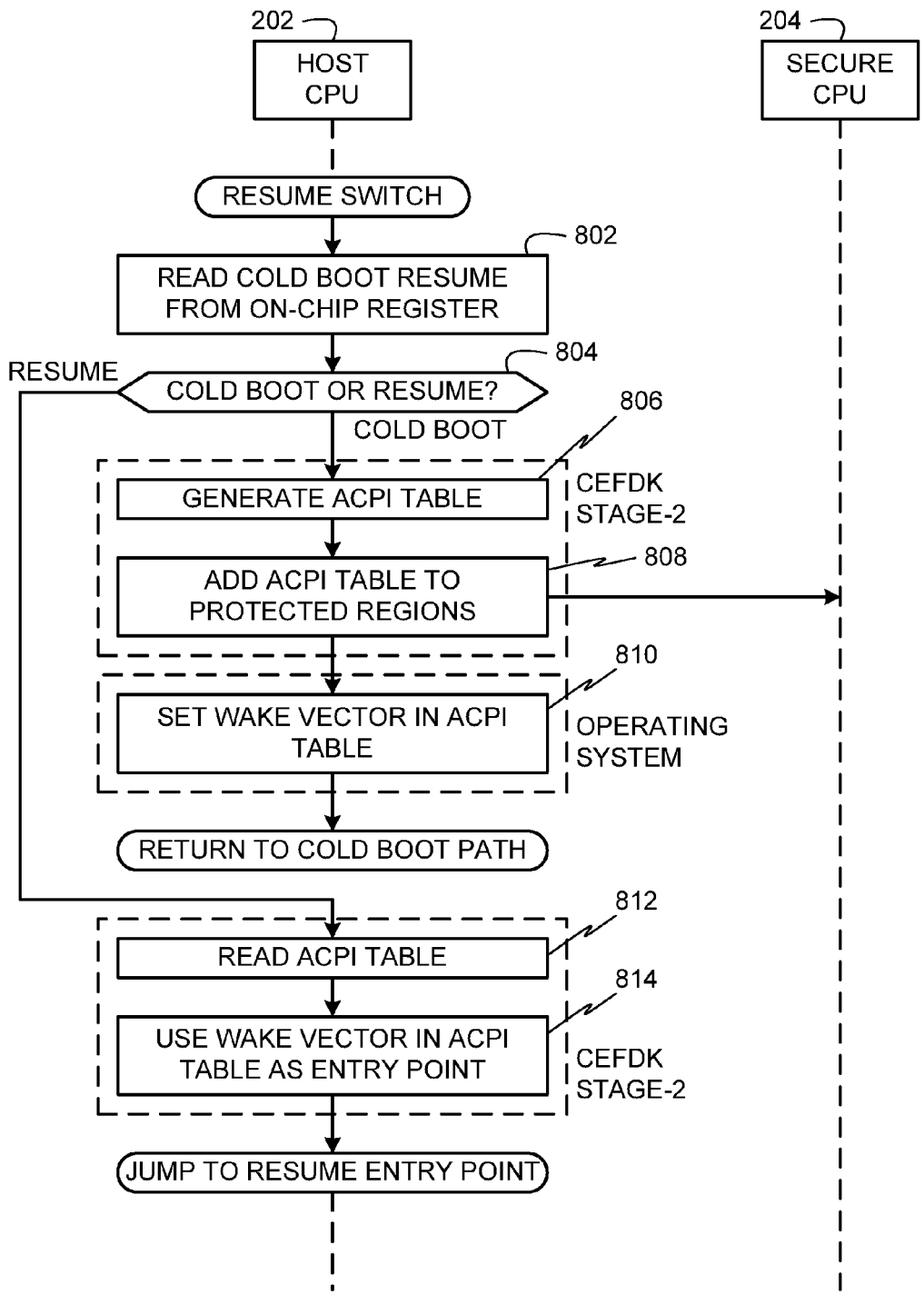
FIG. 8 illustrates an example flow diagram representative of computer readable instructions that may be executed to boot a processor system under a cold boot process or a resume process to resume from a low-power state.

FIG. 8 illustrates an example flow diagram representative of computer readable instructions that may be executed to boot the processor system 100 (FIGS. 1 and 2) under a cold boot process or a suspend-to-RAM resume process. The example process of FIG. 8 may be instantiated by the call resume switch operation of block 522 of FIG. 5. Initially, the host CPU 202 reads a cold boot resume flag from an on-chip register (block 802). For example, the cold boot resume flag may be set in an on-chip register in the host CPU 202 to indicate whether the boot process is a cold boot process, or is a resume process to transition the processor system 100 from a low-power mode such as the suspend-to-RAM power state 104 to the active power state 102 of FIG. 1.

The host CPU 202 determines whether the boot process is a cold boot or a resume (block 804) based on the cold boot resume flag read at block 802. If the boot process is a cold boot (block 804), the host CPU 202 generates an ACPI table (block 806) and adds the ACPI table to the protected regions 218 (block 808) as part of a CEFDK (Consumer Electronics Firmware Development Kit) stage-2 process. In the illustrated example, the ACPI table is added to the protected regions 218 so that the ACPI table is protected by the signing/authentication of the STR data structure 216. The host CPU 202 sets a wake vector in the ACPI table (block 810) as part of an operating system process. Control then returns to a cold boot path (e.g., in FIG. 5), and the example process of FIG. 8 ends.

If the host CPU 202 determines at block 804 that the boot process is a resume, the host CPU 202 reads a previously generated and stored ACPI table (block 812), and uses a wake vector in the ACPI table as an entry point in an operating system (block 814) as part of a CEFDK stage-2 process to proceed with the resume process. In the illustrated example, the ACPI table accessed at blocks 812 and 814 may be an ACPI table generated and stored in the protected regions 218 during a cold boot process (e.g., at blocks 806 and 808), and the wake vector used at block 814 may be a wake vector set during the cold boot process (e.g., at block 810). Control then jumps to a resume entry point, and the example process of FIG. 8 ends.

Figure 9:
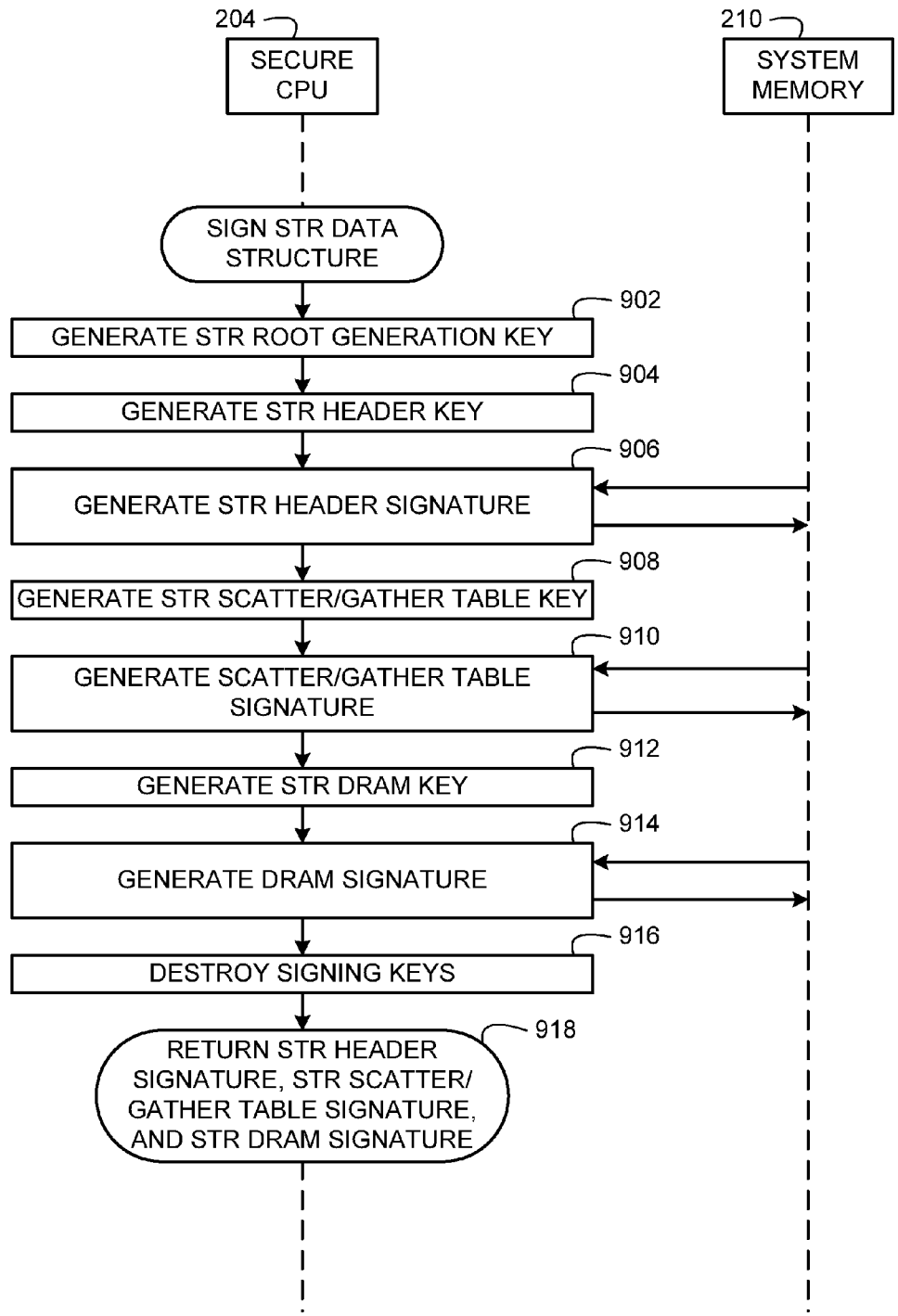
FIG. 9 illustrates an example flow diagram representative of computer readable instructions that may be executed to generate signatures useable to authenticate a suspend-to-RAM data structure.

FIG. 9 illustrates an example flow diagram representative of computer readable instructions that may be executed to generate signatures useable to authenticate/sign the STR data structure 216 of FIG. 2. The example process of FIG. 9 may be used to implement the operation of block 614 of FIG. 6. The example process of FIG. 9 generates keys used to generate the signatures of the STR header signature field 302, the STR scatter/gather table signature field 304, and the STR DRAM signature field 306 of FIG. 3 to sign the STR data structure 216 of FIG. 2. The keys generated in the process of FIG. 9 are on-die secret keys that are handled securely so that they are not accessible by the host software. In the illustrated example, to ensure the security of the keys, only the secure CPU 204 is able to generate the keys. In addition, the secure CPU 204 of the illustrated example is configured to generate the keys using a process that enables the secure CPU 204 to identically re-create or re-generate the keys at later times by, for example, seeding an on-die key generator with the same value when a key needs to be re-created. The keys of the illustrated example are identically re-creatable so that the secure CPU 204 can sign the STR data structure 216 based on keys generated during a transition to the suspend-to-RAM power state 104, and so that upon resuming from the suspend-to-RAM power state 104, the secure CPU 204 can generate the same keys for use in confirming the authentication/signing of the STR data structure 216 that occurred when entering the suspend-to-RAM power state 104.

As shown in FIG. 9, initially, the secure CPU 204 generates an STR root generation key (block 902). In the illustrated example, the secure CPU 204 uses the STR root generation key to generate subsequent keys for generating the signatures of the STR header signature field 302, the STR scatter/gather table signature field 304, and the STR DRAM signature field 306 of FIG. 3. The secure CPU 204 generates an STR header key (block 904) using the STR root generation key. The secure CPU 204 generates an STR header signature (block 906), for example, corresponding to the STR header signature field 302. In the illustrated example, the secure CPU 204 generates the STR header signature by applying a signature function (e.g., a CMAC function, an HMAC function, etc.) to the STR header key generated at block 904, and a concatenation of an STR header (e.g., stored in the STR header 308 of FIG. 3) and a nonce value (e.g., the random/pseudo-random value 222 of FIG. 2). For example, the signature generation function used at block 906 may be SIGNATURE(STR HEADER KEY, CONCATENATE(STR HEADER, NONCE)).

The secure CPU 204 generates an STR scatter/gather table key (block 908) using the STR root generation key. The secure CPU 204 generates an STR scatter/gather table signature (block 910), for example, corresponding to the STR scatter/gather table 310 of FIG. 3. In the illustrated example, the secure CPU 204 generates the STR scatter/gather table signature by applying a signature function (e.g., a CMAC function, an HMAC function, etc.) to the STR scatter/gather table key generated at block 908, and a concatenation of information stored in the STR scatter/gather table 310 (e.g., pointer and size information stored in the fields 312, 320, 322, 324, 326, and 328 of the STR scatter/gather table 310 of FIG. 3) and a nonce value (e.g., the random/pseudo-random value 222 of FIG. 2). For example, the signature generation function used at block 906 may be SIGNATURE(STR SCATTER/GATHER TABLE KEY, CONCATENATE(SCATTER/GATHER TABLE, NONCE)).

The secure CPU 204 generates an STR DRAM key (block 912) using the STR root generation key. The secure CPU 204 generates an STR DRAM signature (block 914), for example, corresponding to the first 16-byte aligned buffer of the protected regions 218 pointed to by a pointer stored in the pointer-0 field 312 of the scatter/gather table 310. In the illustrated example, the secure CPU 204 generates the STR DRAM signature by applying a signature function (e.g., a CMAC function, an HMAC function, etc.) to the STR DRAM key generated at block 912, and a concatenation of the 16-byte aligned buffer of the protected regions 218 pointed to by the pointer in the pointer-0 field 312, and a nonce value (e.g., the random/pseudo-random value 222 of FIG. 2). For example, the signature generation function used at block 914 may be SIGNATURE(STR DRAM KEY, CONCATENATE (STR DRAM AREA, NONCE)).

The secure CPU 204 destroys the keys generated at blocks 902, 904, 908, and 912 (block 916). Destroying the keys provides further protection against the keys being accessed in undesirable manners. The example process of FIG. 9 returns the STR header signature, the STR SG table signature, and the STR DRAM key (block 918) to a calling function or process such as the example process of FIG. 6. The example process of FIG. 9 then ends.

Although the example process of FIG. 9 is described as generating three signatures (i.e., the signatures generated at blocks 906, 910, and 914), in other examples, fewer signatures (e.g., one signature or two signatures) or more signatures (e.g., more than three signatures) may be generated for use in authenticating/signing the STR data structure 216.

Figure 10:
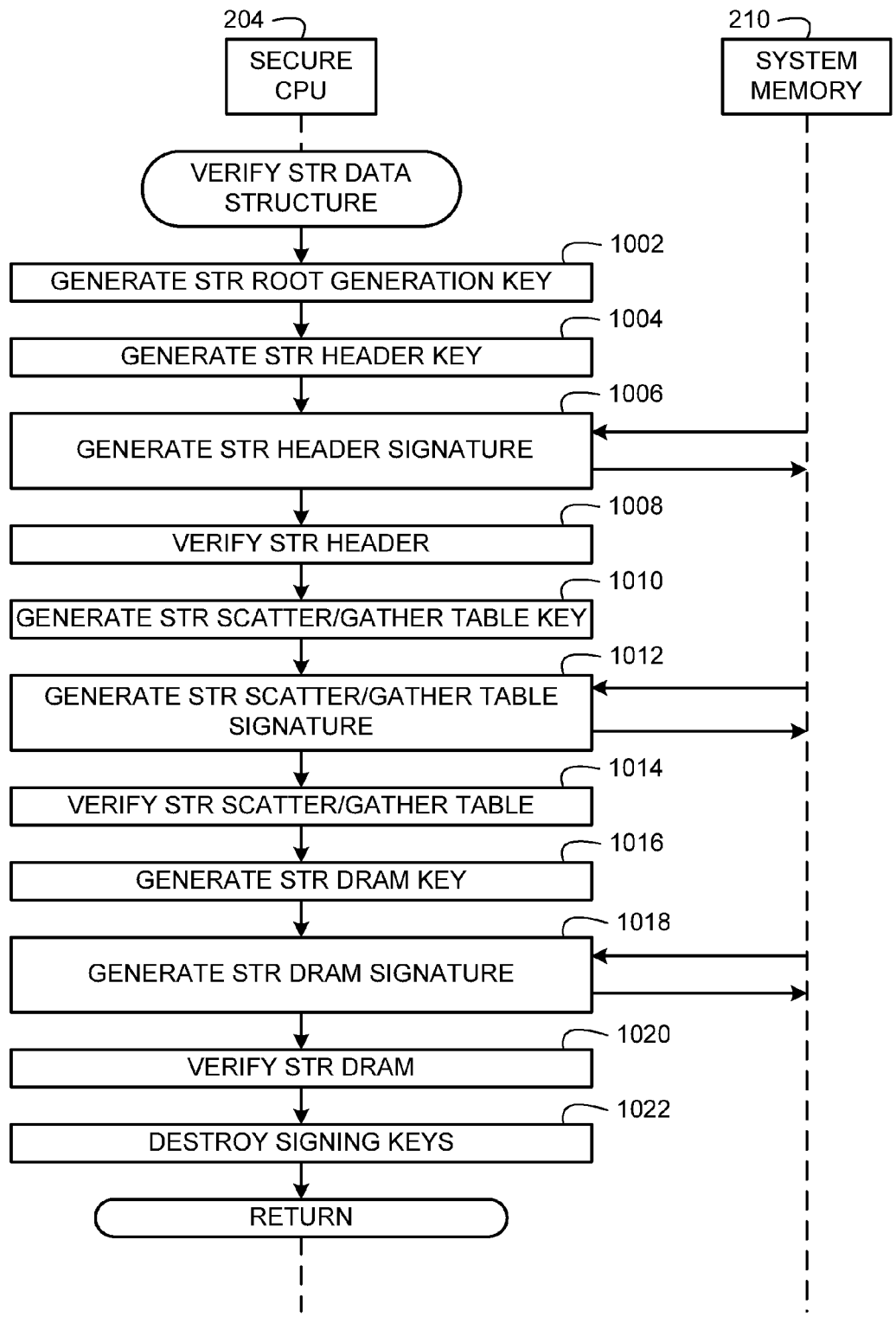
FIG. 10 illustrates an example flow diagram representative of computer readable instructions that may be executed to verify the validity of a suspend-to-RAM data structure.

FIG. 10 illustrates an example flow diagram representative of computer readable instructions that may be executed to verify the validity the STR data structure 216 (FIG. 2). The example process of FIG. 10 may be used to implement the operation of 712 of FIG. 7A when verifying DRAM during a resume process from the suspend-to-RAM power state 104 of FIG. 1. To confirm the validity of the STR data structure 218, the example process is used to generate keys and signatures in the same manner as described above in connection with FIG. 9. As discussed above, the keys used to generate the signatures are identically re-creatable by the secure CPU 204 at subsequent times, for example, by seeding a key generator with the same seed value as used in the process of FIG. 9. The keys are then used to generate signatures based on the STR data structure 216 to compare against the signatures stored in the STR data structure 216 (e.g., in the STR header signature field 302, the STR scatter/gather table signature field 304, and the STR DRAM signature field 306 of FIG. 3). Because the keys generated in the example process of FIG. 10 are identical to the keys generated in the example process of FIG. 9, the signatures generated in the verification process of FIG. 10 when resuming from the suspend-to-RAM power state 104 should match the signatures generated in the authentication process of FIG. 9 when entering the suspend-to-RAM power state 104, if the contents of the STR data structure 216 have not been altered (e.g., have not been compromised by a potential attacker).

As shown in FIG. 10, initially, the secure CPU 204 generates a STR root generation key (block 1002). For example, the secure CPU 204 can generate the STR root generation key in the same manner as it generated the STR root generation key at block 902 of FIG. 9. The secure CPU 204 generates a STR header key (block 1004), for example, in the same manner as it generated the STR header key at block 904 of FIG. 9. The secure CPU 204 generates an STR header signature (block 1006), for example, in the same manner as it generated the STR header signature (e.g., of the STR header signature field 302) at block 906 of FIG. 9.

The secure CPU 204 verifies the STR header of the STR data structure 216 (block 1008). For example, the secure CPU 204 compares the STR header signature generated at block 1006 to the STR header signature stored in the STR data structure 216 (e.g., in the STR header signature field 302 of FIG. 3) to determine whether the STR header (e.g., the STR header in the STR header field 308 of FIG. 3) of the STR data structure 216 is valid. If the STR header has not changed since the processor system 100 entered the suspend-to-RAM power state 104, the signatures will match to confirm that the STR header is valid.

The secure CPU 204 generates an STR scatter/gather table key (block 1010), for example, in the same manner as it generated the STR scatter/gather table key at block 908 of FIG. 9. The secure CPU 204 generates an STR scatter/gather table signature (block 1012), for example, in the same manner as it generated the STR scatter/gather table signature at block 910 of FIG. 9. The secure CPU 204 verifies the STR scatter/gather table of the STR data structure 216 (block 1014). For example, the secure CPU 204 compares the STR scatter/gather signature generated at block 1006 to the STR scatter/gather signature stored in the STR data structure 216 (e.g., in the STR scatter/gather signature field 304 of FIG. 3) to determine whether the STR scatter/gather table (e.g., the STR scatter/gather table location and size information in the STR scatter/gather table 310 of FIG. 3) of the STR data structure 216 is valid. If the STR scatter/gather table information has not changed since the processor system 100 entered the suspend-to-RAM power state 104, the signatures will match to confirm that the STR scatter/gather table information is valid.

The secure CPU 204 generates an STR DRAM key (block 1016), for example, in the same manner as it generated the STR DRAM key at block 912 of FIG. 9. The secure CPU 204 generates an STR DRAM signature (block 1018), for example, in the same manner as it generated the STR DRAM signature at block 914 of FIG. 9. The secure CPU 204 verifies the STR DRAM area pointed to by the STR data structure 216 (block 1020). For example, the secure CPU 204 compares the STR DRAM signature generated at block 1018 to the STR DRAM signature stored in the STR data structure 216 (e.g., in the STR DRAM signature field 306 of FIG. 3) to determine whether the 16-byte aligned buffer of the protected regions 218 pointed to by the pointer-0 312 of FIG. 3 is valid. If the information in the 16-byte aligned buffer has not changed since the processor system 100 entered the suspend-to-RAM power state 104, the signatures will match to confirm that the 16-byte aligned buffer of the protected regions 218 pointed to by the pointer in the pointer-0 field 312 is valid.

The secure CPU 204 destroys the keys generated at blocks 1002, 1004, 1010, and 1016 (block 1022). Destroying the keys provides further protection against the keys being accessed in undesirable manners. The example process of FIG. 10 returns the verification status to a calling function or process such as the example process of FIGS. 7A and 7B, and the example process of FIG. 10 ends.

Although the example process of FIG. 10 is described as generating three signatures (i.e., the signatures generated at blocks 1006, 1012, and 1018), in other examples, fewer signatures (e.g., one signature or two signatures) or more signatures (e.g., more than three signatures) may be generated for use in verifying the validity of the STR data structure 216. In any case, the same number of signature(s) should be generated in the example process of FIG. 10 as generated in the example process of FIG. 9.

Disclosed example methods manage power states in a processor system. Some disclosed example methods involve, when transitioning a processor system to a low-power mode, generating at least a first signature based on a data structure storing memory addresses of memory regions to be protected during the low-power mode. Some disclosed example methods also involve, during a resume process of the processor system from the low-power mode, generating at least a second signature based on the data structure storing the memory addresses of the memory regions to be protected during the low-power mode. Some disclosed example methods also involve resuming the processor system from the low-power mode when the first signature matches the second signature, and/or generating an error when the first signature does not match the second signature. In some examples, the low-power mode is a suspend-to-random access memory power state in which operating states of platform software are stored in a random access memory that remains powered during the suspend-to-random access memory power state.

Some disclosed examples also involve generating at least one key and a random or pseudo-random value, and using the at least one key and the random or pseudo-random value in combination with information in the data structure to generate the first signature. In some examples, the information in the data structure includes at least one of a data structure header or memory addresses and data sizes of the protected memory regions. Some disclosed examples also involve re-generating the at least one key, retrieving the random or pseudo-random value from a continuously powered memory during the resume process, and using the re-generated key and the retrieved random or pseudo-random value to generate the second signature.

Some disclosed examples also involve determining at least one or some of the memory regions to be protected based on a manufacturer required regions table in which a hardware manufacturer of the processor system or a component of the processor system specifies the at least some of the memory regions to be protected. Some disclosed examples also involve determining another of the memory regions to be protected based on a third-party required regions table in which a third party specifies the another of the memory regions to be protected.

Some disclosed examples also involve storing a pointer to the data structure in a continuously powered memory during the low-power mode. Some disclosed examples also involve retrieving the pointer from the continuously powered memory during the resume process, and locating the data structure during the resume process based on the pointer.

Also disclosed are example tangible computer readable storage media comprising example disclosed instructions that, when executed, cause a machine to perform at least some example methods disclosed herein.

Disclosed example apparatus suspend a processor system. Some disclosed example apparatus include a first memory, and a processor in communication with the first memory. In some examples, the first memory is to remain powered when the processor system is in a low-power mode, and the first memory is to store a random or pseudo-random value, and a pointer to a data structure. In some examples, the data structure is to store at least a first signature to authenticate information stored in the data structure that specifies memory regions to store an operating state of the processor system during the low-power mode. In some examples, the processor is to generate the first signature based on the data structure and the random or pseudo-random value when the processor system is transitioning to the low-power mode. In some examples, when the processor system is in a resume process to resume from the low-power mode, the processor is to generate at least a second signature based on the data structure and the random or pseudo-random value, and determine whether the data structure is valid based on a comparison of at least the first signature and the second signature. In some examples, the low-power mode is a suspend-to-random access memory power state in which the operating state is stored in a random access memory that remains powered during the suspend-to-random access memory power state. In some examples, the first memory is an embedded static random access memory, and example apparatus further comprise a dynamic random access memory to store the data structure.

In some examples, the processor is further to determine at least some of the memory regions based on a manufacturer required regions table in which a hardware manufacturer of the processor system or a component of the processor system specifies the at least some of the memory regions. In some examples, the processor is further to determine a second one of the memory regions based on a third-party required regions table in which a third party specifies the second one of the memory regions. In some examples, the processor is to generate the first and second signatures based on at least one of a data structure header or memory addresses and data sizes of the protected memory regions.

In some examples, the processor is a secure processor in communication with a host processor. In such some examples, when the data structure is not valid based on the comparison of at least the first signature and the second signature, the secure processor is to communicate an error status to the host processor, and the host processor is to perform a hardware reset based on the error status.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to manage power states in a processor system, comprising:
    generating at least one key and a random or pseudo-random value;
    when transitioning a processor system to a low-power mode, using the at least one key and the random or pseudo-random value to generate at least a first signature based on a data structure storing memory addresses of memory regions to be protected during the low-power mode;
    during a resume process of the processor system from the low-power mode, generating at least a second signature based on the data structure storing the memory addresses of the memory regions to be protected during the low-power mode;
    when the first signature matches the second signature, resuming the processor system from the low-power mode; and
    when the first signature does not match the second signature, generating an error.

2. The method of claim 1, wherein the low-power mode is a suspend-to-random access memory power state in which operating states of platform software are stored in a random access memory that remains powered during the suspend-to-random access memory power state.

3. The method of claim 1, wherein generating the first signature based on the data structure comprises generating the first signature based on at least one of a data structure header or the memory addresses and data sizes of the memory regions to be protected.

4. The method of claim 1, further comprising re-generating the at least one key, retrieving the random or pseudo-random value from a continuously powered memory during the resume process, and using the re-generated key and the retrieved random or pseudo-random value to generate the second signature.

5. A method to manage power states in a processor system, comprising:
    when transitioning a processor system to a low-power mode, generating at least a first signature based on a data structure storing memory addresses of memory regions to be protected during the low-power mode;
    determining at least some of the memory regions to be protected based on a manufacturer required regions table in which a hardware manufacturer of the processor system specifies the at least some of the memory regions to be protected;
    determining another of the memory regions to be protected based on a third-party required regions table in which a third party specifies the another of the memory regions to be protected;
    during a resume process of the processor system from the low-power mode, generating at least a second signature based on the data structure storing the memory addresses of the memory regions to be protected during the low-power mode;
    when the first signature matches the second signature, resuming the processor system from the low-power mode; and
    when the first signature does not match the second signature, generating an error.

6. The method of claim 1, further comprising storing a pointer to the data structure in a continuously powered memory during the low-power mode.

7. The method of claim 6, further comprising retrieving the pointer from the continuously powered memory during the resume process, and locating the data structure during the resume process based on the pointer.

8. An apparatus to suspend a processor system, comprising:
    a first memory to remain powered when a processor system is in a low-power mode, the first memory to store:
        a random or pseudo-random value, and
        a pointer to a data structure, the data structure to store at least a first signature to authenticate information stored in the data structure that specifies memory regions to store an operating state of the processor system during the low-power mode; and a processor in communication with the first memory, the processor to:

generate the first signature based on the data structure and the random or pseudo-random value when the processor system is transitioning to the low-power mode, and when the processor system is in a resume process to resume from the low-power mode:

generate at least a second signature based on the data structure and the random or pseudo-random value, and determine whether the data structure is valid based on a comparison of at least the first signature and the second signature.

9. The apparatus of claim 8, wherein the low-power mode is a suspend-to-random access memory power state in which the operating state is stored in a random access memory that remains powered during the suspend-to-random access memory power state.

10. The apparatus of claim 8, wherein the processor is further to determine at least some of the memory regions based on a manufacturer required regions table in which a hardware manufacturer of the processor system or a component of the processor system specifies the at least some of the memory regions.

11. The apparatus of claim 10, wherein the processor is further to determine a second one of the memory regions based on a third-party required regions table in which a third party specifies the second one of the memory regions.

12. The apparatus of claim 8, wherein the processor is to generate the first and second signatures based on at least one of a data structure header or memory addresses and data sizes of the protected memory regions.

13. The apparatus of claim 8, wherein the processor is a secure processor, and further comprising a host processor in communication with the secure processor, when the data structure is not valid based on the comparison of at least the first signature and the second signature:

the secure processor is to communicate an error status to the host processor; and the host processor is to perform a hardware reset based on the error status.

14. The apparatus of claim 8, wherein the first memory is an embedded static random access memory, and further comprising a dynamic random access memory to store the data structure.

15. A tangible computer readable storage medium comprising instructions that, when executed, cause a machine to at least:

generate at least one key and a random or pseudo-random value;

when transitioning a processor system to a low-power mode, use the at least one key and the random or pseudo-random value to generate at least a first signature based on a data structure storing memory addresses of memory regions to be protected during the low-power mode;

during a resume process of the processor system from the low-power mode, generate at least a second signature based on the data structure storing the memory addresses of the memory regions to be protected during the low-power mode;

resume the processor system from the low-power mode when the first signature matches the second signature; and generate an error when the first signature does not match the second signature.

16. A tangible computer readable storage medium comprising instructions that, when executed, cause a machine to at least:

when transitioning a processor system to a low-power mode, generate at least a first signature based on a data structure storing memory addresses of memory regions to be protected during the low-power mode;

determine at least one of the memory regions to be protected based on a manufacturer required regions table in which a hardware manufacturer of the processor system specifies the at least one of the memory regions to be protected;

determine a second one of the memory regions to be protected based on a third-party required regions table in which a third party specifies the second one of the memory regions to be protected;

during a resume process of the processor system from the low-power mode, generate at least a second signature based on the data structure storing the memory addresses of the memory regions to be protected during the low-power mode;

resume the processor system from the low-power mode when the first signature matches the second signature; and generate an error when the first signature does not match the second signature.

17. The tangible computer readable storage medium of claim 15, wherein the instructions further cause the machine to:

re-generate the at least one key, retrieve the random or pseudo-random value from a continuously powered memory during the resume process, and use the re-generated key and the retrieved random or pseudo-random value to generate the second signature.

18. The method of claim 1, further comprising determining at least some of the memory regions to be protected based on a manufacturer required regions table in which a component of the processor system specifies the at least some of the memory regions to be protected.

19. The tangible computer readable storage medium of claim 15, wherein the instructions further cause the machine to determine at least one of the memory regions to be protected based on a manufacturer required regions table in which a component of the processor system specifies the at least one of the memory regions to be protected.

* * * * *